(12) United States Patent
Mizuguchi et al.

(10) Patent No.: US 11,110,929 B2
(45) Date of Patent: Sep. 7, 2021

(54) ANTI-SKID CONTROL DEVICE FOR VEHICLE

(71) Applicant: ADVICS CO., LTD., Kariya (JP)

(72) Inventors: Yohei Mizuguchi, Kariya (JP); Masato Terasaka, Ichinomiya (JP)

(73) Assignee: ADVICS CO., LTD., Kariya (JP)

( * ) Notice: Subject to any disclaimer, the term of this patent is extended or adjusted under 35 U.S.C. 154(b) by 153 days.

(21) Appl. No.: 16/347,224

(22) PCT Filed: Nov. 10, 2017

(86) PCT No.: PCT/JP2017/040566
§ 371 (c)(1),
(2) Date: May 3, 2019

(87) PCT Pub. No.: WO2018/088514
PCT Pub. Date: May 17, 2018

(65) Prior Publication Data
US 2019/0256099 A1 Aug. 22, 2019

(30) Foreign Application Priority Data
Nov. 11, 2016 (JP) .............................. JP2016-220102

(51) Int. Cl.
*B60W 40/105* (2012.01)
*B60T 8/171* (2006.01)
(Continued)

(52) U.S. Cl.
CPC ....... *B60W 30/18172* (2013.01); *B60T 8/171* (2013.01); *B60T 8/1761* (2013.01);
(Continued)

(58) Field of Classification Search
CPC ..... B60W 30/18172; B60W 30/18109; B60W 40/105; B60W 2520/10; B60W 2520/26;
(Continued)

(56) References Cited

U.S. PATENT DOCUMENTS 5,797,664 A * 8/1998 Tagawa .............. B60K 23/0808
180/244
2003/0028309 A1* 2/2003 Inoue .................. B60T 8/17636
701/81

FOREIGN PATENT DOCUMENTS

JP 2003048526 A 2/2003

OTHER PUBLICATIONS

International Search Report (PCT/ISA/210) dated Feb. 13, 2018, by the Japan Patent Office as the International Searching Authority for International Application No. PCT/JP2017/040566.
(Continued)

*Primary Examiner* — Peter D Nolan
*Assistant Examiner* — Ashley L Redhead, Jr.
(74) *Attorney, Agent, or Firm* — Buchanan Ingersoll & Rooney PC

(57) ABSTRACT

Anti-skid control is performed by switching between a reduction mode for reducing braking torque and an increase mode for increasing braking torque based on a comparison between four wheel speeds and vehicle body speed. A controller calculates wheel accelerations based on wheel speeds and includes a control mode condition where the reduction mode is selected at each wheel and a wheel acceleration condition where each wheel acceleration is within a predetermined value range. If a state in which the control mode condition and the wheel acceleration condition are simultaneously satisfied is maintained over a predetermined time period, the controller determines that a residual state is satisfied. When the residual state is not satisfied, the controller calculates vehicle body speed based on the maximum value of the wheel speeds, whereas when the residual state is satisfied, the controller calculates vehicle body speed based on the minimum value of the wheel speeds.

3 Claims, 4 Drawing Sheets

(51) Int. Cl.
  *B60T 8/32*      (2006.01)
  *B60T 8/1761*    (2006.01)
  *B60W 30/18*     (2012.01)

(52) U.S. Cl.
  CPC ......... *B60T 8/32* (2013.01); *B60W 30/18109* (2013.01); *B60W 40/105* (2013.01); *B60W 2520/10* (2013.01); *B60W 2520/26* (2013.01); *B60W 2520/28* (2013.01)

(58) Field of Classification Search
  CPC ...... B60W 2520/28; B60T 8/171; B60T 8/32; B60T 8/1761
  See application file for complete search history.

(56) References Cited

OTHER PUBLICATIONS

Written Opinion (PCT/ISA/237) dated Feb. 13, 2018, by the Japan Patent Office as the International Searching Authority for International Application No. PCT/JP2017/040566.

* cited by examiner

ANTI-SKID CONTROL DEVICE FOR VEHICLE

TECHNICAL FIELD

The present invention relates to an anti-skid control device for a vehicle.

BACKGROUND ART

Patent literature 1 describes, in an aim of "providing an anti-skid control device in a four wheel drive vehicle that can prevent erroneous judgment at the time of traveling on a rough road or the like and reliably detect drive system vibration, so that occurrence of troubles such as missing of deceleration, insufficient deceleration, increase in braking stop distance, and the like due to erroneous judgment can be prevented while allowing the execution of a drive system vibration convergence process only at the time of occurrence of the drive system vibration", "calculating an absolute value of a difference between an average value VWDFA of wheel accelerations VWDFL, VWDFR of the left and right front wheels 14, 10 and an average value of wheel accelerations VWDRL, VWDRR of the left and right rear wheels 22, 20 as DVWD_FR (=|VWDFA-VWDRA|)VWDFA-VWDRA|), and judging that the drive system vibration occurred when such acceleration difference DVWD_FR exceeds a vibration judgment approach threshold value DVWDVIB#.

In the anti-skid control device for the four-wheel drive vehicle, there is a problem caused not only by the above-described drive system vibration but also by the acceleration slip. This will be described with reference to a time series diagram of FIG. 4. In FIG. 4, a situation where sudden braking is performed immediately after the vehicle is rapidly accelerated, and the antiskid control is started is assumed.

Until time point t0, the vehicle is rapidly accelerated, and a wheel speed Vwa [] is increased. Since the wheel speed Vwa [] includes an acceleration slip Sks, the wheel speed Vwa [] is larger than a true value Vxs of a vehicle body speed. Due to the acceleration slip Sks, the vehicle body speed Vxa estimated from the wheel speed Vwa [] becomes a value larger than its true value Vxs. Here, when the wheel speed Vwa [] matches the true value Vxs of the vehicle body speed, neither the acceleration slip Sks nor the deceleration slip Sgn is included in the wheel speed Vwa [].

At time point t0, the driver releases the foot from the accelerator pedal, and the acceleration operation is ended. Then, at time point t1 immediately thereafter, an abrupt braking operation is started. Due to such sudden braking, the anti-skid control is started at time point t2.

Since the wheel WH [] is connected to a power source PWU through a transmission TRN, the influence of acceleration still remains. In addition, in a four-wheel drive vehicle, since the wheel WH [] is mechanically connected to the power source PWU and the transmission TRN, its moment of inertia is relatively large. Therefore, after the time point t2 at when the anti-skid control is started, the speed Vwa [] of each wheel WH [] is gradually reduced toward the true value Vxs of the vehicle body speed while the influence of acceleration remains.

In the anti-skid control, the vehicle body speed Vxa is determined based on the fastest of the four wheel speeds Vwa []. Therefore, the maximum value of the wheel speed Vwa [] is adopted for the determination of the vehicle body speed Vxa. As a result, the vehicle body speed Vxa is calculated to have a relatively large value.

In the anti-skid control, the slip state quantity Slp [] is calculated based on the difference between the wheel speed Vwa [] and the vehicle body speed Vxa. Then, a braking torque (i.e., wheel cylinder hydraulic pressure) is adjusted based on the slip state quantity Slp []. Therefore, when the vehicle body speed Vxa is determined to be relatively large, the slip state quantity Slp is determined to be large, and the braking torque is easily reduced. That is, due to the influence of the acceleration slip Sks remaining in the wheel speed Vwa [], the braking torque may be reduced more than necessary in the anti-skid control.

As described above, in the anti-skid control device for a vehicle applied to a four-wheel drive vehicle, it is desired that an influence of the acceleration slip Sks is compensated and a vehicle body speed Vxa can appropriately be estimated.

CITATIONS LIST

Patent Literature

Patent Literature 1: Japanese Unexamined Patent Application Publication No. 2003-048526

SUMMARY OF INVENTION

Technical Problems

An object of the present invention is to provide a four-wheel drive vehicle in which a vehicle body speed is appropriately calculated and an anti-skid control can be suitably executed.

Solutions to Problems

An anti-skid control device for a vehicle applied to a four wheel drive vehicle in which a driving force from a driving source (PWU) of the vehicle is transmitted to four wheels (WH[]) according to the present invention includes a wheel speed sensor (VWA[]) that detects wheel speeds (Vwa[]) of four wheels (WH[]) of the vehicle; and a controller (ECU) that calculates a vehicle body speed (Vxa) of the vehicle based on at least one of the four wheel speeds (Vwa[]) and executes an anti-skid control for suppressing lock tendency of the four wheels (WH[]) by selectively switching between a reduction mode (Mgn) of reducing a braking torque applied to the four wheels (WH[]) and an increase mode (Mzo) of increasing the braking torque based on a comparison result (Slp[]) between the four wheel speeds (Vwa[**]) and the vehicle body speed (Vxa).

In the anti-skid control device for the vehicle according to the present invention, the controller (ECU) calculates the accelerations (dVw []) of the four wheels (WH []) based on the four wheel speeds (Vwa []) and is configured to include a control mode condition of selecting the reduction mode (Mgn) in the four wheels (WH []) and a wheel acceleration condition in which the accelerations (dVw []) of the four wheels (WH []) are within a range of a predetermined value (dvx) (|dVw []|<dvx). The controller determines as a residual state (FLzn=1) when a state in which the control mode condition and the wheel acceleration condition are satisfied at the same time is continued for a predetermined time (tkx). The controller calculates the vehicle body speed (Vxa) based on a maximum speed value (Vwa[]d), which is a maximum value of the four wheel speeds (Vwa[]) when determined as not the residual state (FLzn=0), and calculates the vehicle body speed (Vxa) based on a minimum speed value (Vwa[]s), which is a minimum value of the four wheel speeds (Vwa[**]) when determined as the residual state (FLzn=1).

In the anti-skid control device for the vehicle according to the present invention, the controller (ECU) is configured to include a control mode condition of selecting the reduction mode (Mgn) in the four wheels (WH []) and a wheel speed condition in which a difference (eVw) between the maximum speed value (Vwa[]d) which is the maximum value of the four wheel speeds (Vwa[]) and the minimum speed value (Vwa[]s) which is the minimum value of the four wheel speeds (Vwa[]) is less than or equal to a predetermined speed (vwx). The controller determines as the residual state (FLzn=1) when a state in which the control mode condition and the wheel speed condition are satisfied at the same time is continued for the predetermined time (tkx). The controller calculates the vehicle body speed (Vxa) based on the maximum speed value (Vwa []d) when determined as not the residual state (FLzn=0), and calculates the vehicle body speed (Vxa) based on the minimum speed value (Vwa [**]s) when determined as the residual state (FLzn=1).

When the wheel speed Vwa[] includes the acceleration slip Sks, the maximum value Vwa []d of the wheel speed is deviated the most from the true value Vxs of the vehicle body speed, and the minimum value Vwa []s of the wheel speed is the closest to the true value Vxs. According to the above configuration, "whether or not in the residual state" is determined based on each condition (control mode condition etc.), where the vehicle body speed Vxa is calculated based on the maximum value Vwa[]d when not determined as the residual state, and the vehicle body speed Vxa is calculated based on the minimum value Vwa[]s when determined as the residual state. Therefore, when the wheel speed Vwa[] includes the acceleration slip Sks, the vehicle body speed Vxa is determined with the influence of the acceleration slip Sks suppressed to a minimum. As a result, anti-skid control is suitably executed, and the vehicle can be reliably decelerated.

DESCRIPTION OF EMBODIMENTS

<Explanation of Symbols>

In the following description, configuring members denoted with the same reference symbols, calculation processes, signals, characteristics, and values exhibit the same function. Therefore, redundant explanation may be omitted.

The bracketed subscript [] provided at the end of various symbols indicates to which one of the four wheels of the vehicle it relates to in the front, rear, left and right of the vehicle. Specifically, each subscript corresponds to [fl] for the left front wheel, [fr] for the right front wheel, [rl] for the left rear wheel, and [rr] for the right rear wheel. In addition, the subscript [] may be omitted. For example, the wheel speed sensor VWA [] (written as "VWA" when subscript [] is omitted) comprehensively indicates a wheel speed sensor VWA [fl] for the front left wheel, a wheel speed sensor VWA [fr] for the right front wheel, a wheel speed sensor VWA [rl] for the left rear wheel, and a wheel speed sensor VWA [rr] for the right rear wheel.

<Overall Structure of Anti-Skid Control Device for a Vehicle in Accordance with the Present Invention>

Figure 1:
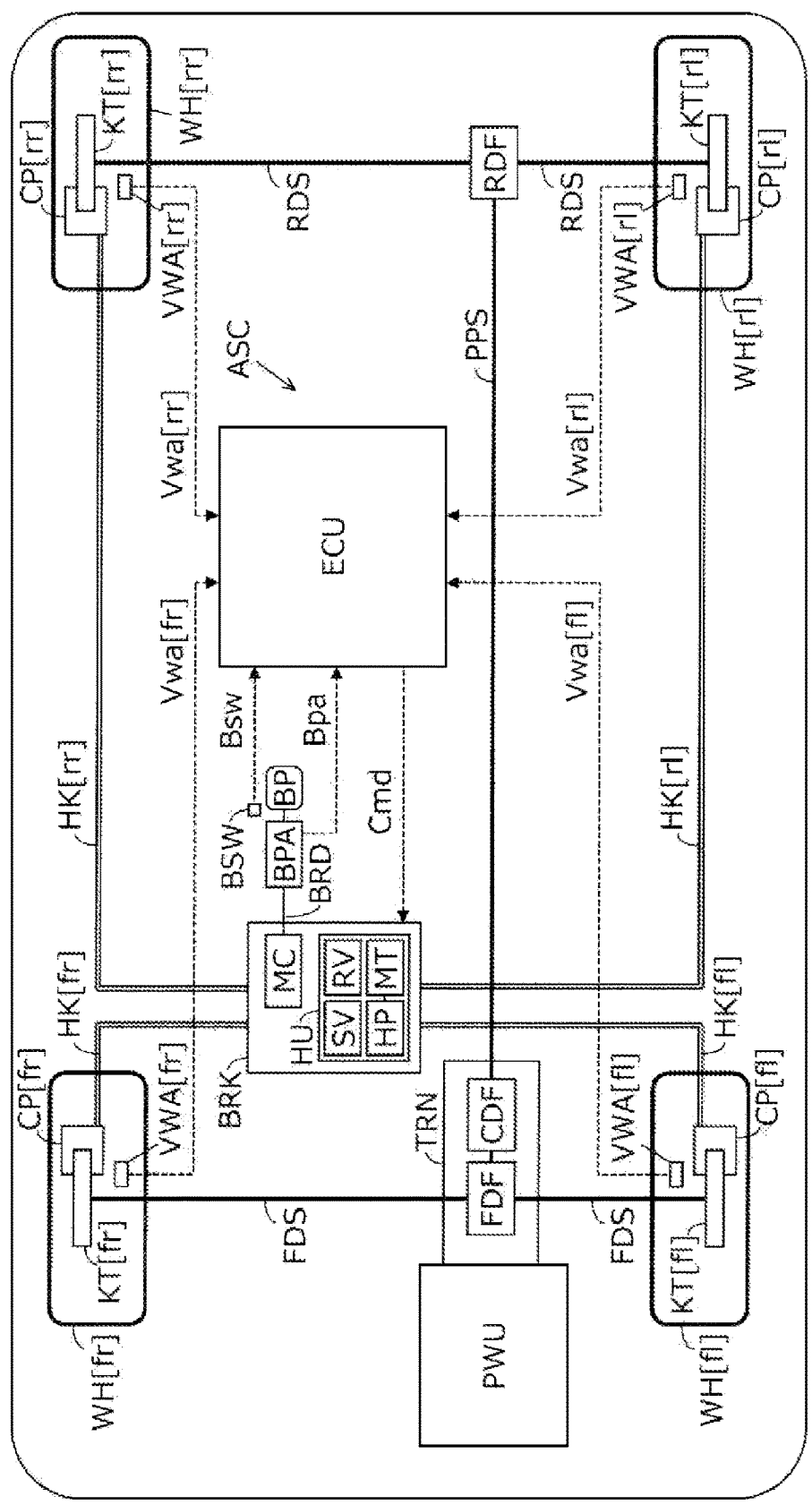
FIG. 1 is an overall configuration view of a vehicle mounted with an antiskid control device ASC for a vehicle in accordance with the present invention.

An anti-skid control device ASC according to the present invention will be described with reference to an overall configuration view of FIG. 1. The vehicle is a four-wheel drive type vehicle in which all four wheels are drive wheels (wheels to which driving force is transmitted).

In a vehicle equipped with the anti-skid control device ASC, a braking operation member BP, a braking operation amount sensor BPA, a brake switch BSW, a controller ECU, a wheel speed sensor VWA [], and a brake actuator (also simply referred to as "actuator") BRK are provided. Furthermore, a brake caliper CP [], a wheel cylinder WC [], a rotating member KT [], and a friction member MS [] are provided on the four wheels WH [] of the vehicle. The actuator BRK and the wheel cylinder WC [] are connected through a brake pipe HK [].

The vehicle (so-called full time 4WD vehicle) includes a power source (power unit) PWU that generates a driving force and a transmission TRN connected to the power source PWU. That is, the wheels WH [**] are always mechanically connected to the power source PWU through the transmission TRN. For example, the power source PWU is an internal combustion engine (so-called engine), an electric motor. The output (driving force) of the power source PWU is appropriately distributed and transmitted to the front wheels WH [fl], WH [fr] and the rear wheels WH [rl], WH [rr] by the transmission TRN. Here, the driving force is transmitted from the transmission TRN to the side of the rear wheels WH [rl], WH [rr] via a propeller shaft PPS.

The front wheel side driving force is transmitted to the left and right front wheels WH [fr], WH [fl] through a front wheel differential FDF and a front wheel drive shaft FDS, respectively. The rear wheel side driving force is transmitted to the left and right rear wheels WH [rr], WH [rl] through a rear wheel differential RDF and a rear wheel drive shaft RDS, respectively. Furthermore, the transmission TRN is provided with a center differential CDF, and the front wheel side driving force and the rear wheel side driving force can be appropriately adjusted according to a traveling state of the vehicle. For example, viscous coupling can be adopted as the center differential CDF.

The braking operation member (e.g., brake pedal) BP is a member operated by a driver to decelerate the vehicle. A braking torque on the wheel WH [] (also simply referred to as "WH") is adjusted by operating the braking operation member BP, and a braking force is generated on the wheel WH. Specifically, a rotating member (e.g., brake disc) KT [] is fixed to the wheel WH of the vehicle. A brake caliper CP [] (also simply referred to as "CP") is disposed so as to sandwich the rotating member KT [] (also simply referred to as "KT").

A wheel cylinder WC [] (also simply referred to as "WC") is provided in the brake caliper (also simply referred to as caliper) CP. As the hydraulic pressure in the wheel cylinder WC of the caliper CP is adjusted (increased or reduced), the piston in the wheel cylinder WC is moved (forward or backward) with respect to the rotating member KT. This movement of the piston causes a friction member (e.g., brake pad) MS [] to be pressed against the rotating member KT, thus generating a pressing force. The rotating member KT and the wheel WH are fixed so as to rotate integrally. Therefore, a braking torque (braking force) is generated in the wheel WH by the frictional force generated by the pressing force.

The braking operation member BP is provided with a braking operation amount sensor (also simply referred to as "operation amount sensor") BPA. The operation amount Bpa of the braking operation member (brake pedal) BP by the driver is detected by the operation amount sensor BPA. Specifically, as the braking operation amount sensor BPA, at least one of a hydraulic pressure sensor that detects the pressure of a master cylinder MC, an operation displacement sensor that detects the operation displacement of the braking operation member BP, and an operation force sensor that detects the operation force of the braking operation member BP is adopted.

In other words, the operation amount sensor BPA is a generic name for the master cylinder hydraulic pressure sensor, the operation displacement sensor, and the operation force sensor. Therefore, the braking operation amount Bpa is determined based on at least one of the hydraulic pressure of the master cylinder MC, the operation displacement of the braking operation member BP, and the operation force of the braking operation member BP. The operation amount Bpa is input to a controller ECU.

In addition, a brake switch BSW is provided in the braking operation member BP. The brake switch BSW is an ON/OFF switch that detects whether or not the braking operation member BP is operated. When the braking operation member BP is operated by the brake switch BSW, an ON signal is transmitted to the controller ECU, and when the braking operation member BP is not operated, an OFF signal is transmitted.

The controller (also referred to as "electronic control unit") ECU is configured by an electric circuit board on which a microprocessor or the like is mounted and a control algorithm programmed in the microprocessor. In the controller ECU, an anti-skid control is executed based on the detection value (wheel speed) Vwa [] (also simply referred to as "Vwa") of the wheel speed sensor VWA [] (also simply referred to as "VWA"). Specifically, a slip state quantity Slp (also simply referred to as "Slp") representing the slip degree of each wheel WH is calculated based on the wheel speed Vwa. Then, based on the slip state quantity Slp [**], a drive signal Cmd for adjusting the hydraulic pressure in the wheel cylinder WC is formed and transmitted to an actuator BRK to reduce the slip degree of each wheel (i.e., suppress excessive deceleration slip Sgn and prevent locking tendency of wheel WH). Here, the drive signal Cmd includes "control mode of reduction mode Mgn or increase mode Mzo", "duty ratio Dug, Duz of electromagnetic valve SV", and "drive instruction of electric motor MT".

Each of the wheels WH of the vehicle is provided with a wheel speed sensor VWA. Four wheel speeds Vwa are detected by the four wheel speed sensors VWA. The wheel speed Vwa is input to the controller ECU.

The brake fluid pressure of the wheel cylinder WC is generated by the brake actuator (also simply referred to as "actuator") BRK in accordance with the operation of the braking operation member BP. In addition, when the anti-skid control is executed, the brake fluid pressure of the wheel cylinder WC is adjusted (increased or reduced) by the actuator BRK. The actuator BRK is configured by the master cylinder MC for generating a brake fluid pressure corresponding to the operation force of the brake pedal BP and a hydraulic unit HU capable of independently adjusting the brake fluid pressure to be supplied to each wheel cylinder WC. The configurations of the master cylinder MC and the hydraulic unit HU are well known and therefore will be briefly described.

The master cylinder MC is mechanically connected to the braking operation member BP through a brake rod BRD. The operation force (brake pedal pressing force) of the braking operation member BP is converted into the pressure of the brake fluid by the master cylinder MC.

The hydraulic unit HU is provided between the master cylinder MC and each wheel cylinder WC. When the anti-skid control is executed, the hydraulic unit HU adjusts the brake fluid pressure Pw [] of each wheel cylinder WC [] independently for each wheel. The hydraulic unit HU is configured by a plurality of electromagnetic valves SV (e.g., two position electromagnetic valves of ON/OFF), a low pressure reservoir RV, a hydraulic pump HP, and an electric motor MT.

In a case where the brake fluid pressure Pw [**] needs to be reduced by the anti-skid control (referred to as "reduction mode Mgn"), the normally open type pressure increasing valve of the electromagnetic valves SV is closed and the normally closed type pressure reducing valve of the electromagnetic valves SV is opened. Since the brake fluid in the wheel cylinder WC is moved to the low pressure reservoir RV, the brake fluid pressure of the wheel cylinder WC is reduced. Here, the pressure reducing speed (time gradient in reducing of brake fluid pressure) is determined by a duty ratio of the pressure reducing valve (time ratio of energized state in constant period) Dug. Specifically, the duty ratio Dug "100%" always corresponds to the open state, and the brake fluid pressure is rapidly reduced. The duty ratio Dug "0%" always corresponds to the closed state.

In a case where the brake fluid pressure Pw [**] needs to be increased by the anti-skid control (referred to as "increase mode Mzo"), the pressure increasing valve of the electromagnetic valves SV is opened and the pressure reducing valve of the electromagnetic valves SV is closed. Then, the brake fluid is moved from the master cylinder MC to the wheel cylinder WC, and the brake fluid pressure of the wheel cylinder WC is increased. Here, the pressure increasing speed (time gradient in increasing of brake fluid pressure) is determined by a duty ratio of the pressure increasing valve (time ratio of energized state in constant period) Duz. Specifically, the duty ratio Duz "0%" always corresponds to the open state and the brake fluid pressure is rapidly increased. The duty ratio Duz "100%" always corresponds to the closed state.

In the reduction mode Mgn, the brake fluid accumulated in the low pressure reservoir RV is returned to the fluid path between the pressure increasing valve of the electromagnetic valve SV and the master cylinder MC by the hydraulic pump HP driven by the electric motor MT. The electromagnetic valve SV (pressure increasing valve, pressure reducing valve) and the electric motor MT are driven (controlled) by the drive signal Cmd.

In a case where the brake fluid pressure needs to be held by the anti-skid control, the pressure reducing valve or the pressure increasing valve of the electromagnetic valve SV is always closed in the reduction mode Mgn or the increase mode Mzo. More specifically, in a case where the brake fluid pressure needs to be held in the reduction mode Mgn, the duty ratio Dug of the pressure reducing valve is determined to be "0% (normally closed state)" by the drive signal Cmd. Furthermore, in a case where the brake fluid pressure needs to be held in the increase mode Mzo, the duty ratio Duz of the pressure increasing valve is determined to be "100% (normally closed state)" by the drive signal Cmd.

<Processing Outline of Anti-Skid Control>

Figure 2:
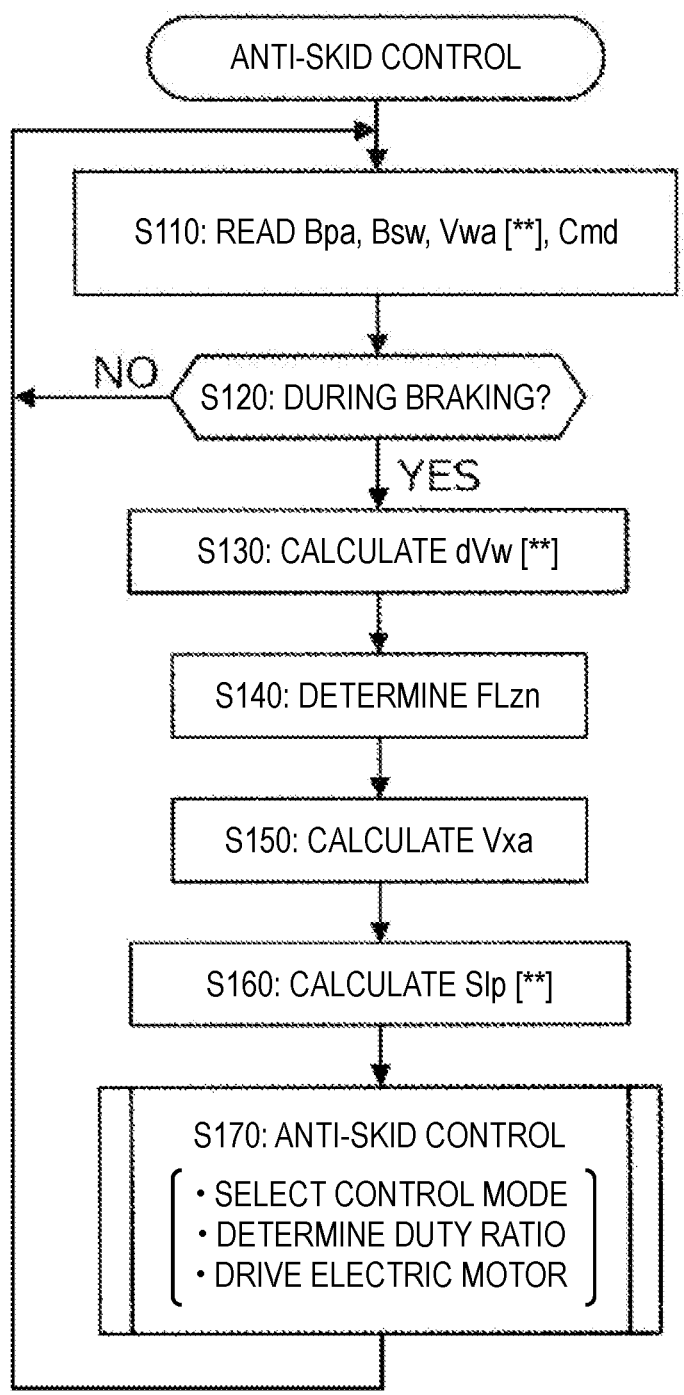
FIG. 2 is a flowchart explaining a processing outline of the anti-skid control.

With reference to the flowchart of FIG. 2, an outline of the overall processing of the anti-skid control (control to reduce excessive slip of the wheel and suppress the locking tendency of the wheel) will be described. The processing of the anti-skid control is programmed in the microprocessor in the controller ECU.

In the anti-skid control, the vehicle body speed Vxa is estimated based on at least one of the four wheel speeds Vwa. Then, the brake fluid pressure of the wheel cylinder WC is adjusted based on a comparison between the wheel speed Vwa and the vehicle body speed Vxa. Adjustment of the brake fluid pressure is achieved by selecting one of the reduction mode (pressure reducing mode) Mgn and the increase mode (pressure increasing mode) Mzo. Here, the reduction mode Mgn and the increase mode Mzo are collectively referred to as "control mode".

In step S110, the braking operation amount Bpa, the brake switch signal Bsw, the wheel speed Vwa [**], and the drive signal Cmd are read. The braking operation amount Bpa is a signal from the braking operation amount sensor BPA and the signal Bsw is a signal from the brake switch BSW. Furthermore, the wheel speed Vwa is detected by the wheel speed sensor VWA provided in the wheel WH. The drive signal Cmd is a drive signal processed in the controller ECU, and includes information such as a control mode (selection result from reduction mode Mgn and increase mode Mzo), a duty ratio (target value) Dug, Duz of the electromagnetic valve SV and the like.

In step S120, "whether or not the vehicle is braking" is determined based on at least one of the braking operation amount Bpa and the switch signal Bsw. For example, determination is made that the vehicle is braking when the operation amount Bpa is greater than or equal to a predetermined value bp0, and determination is made that the vehicle is not braking when the operation amount Bpa is less than the predetermined value bp0. Here, the predetermined value bp0 is a threshold value for determination set in advance and corresponds to "play" of the braking operation member (brake pedal) BP. Furthermore, determination is made that the vehicle is braking when the switch signal Bsw indicates the ON state (ON signal), and determination is made that the vehicle is not braking when the switch signal Bsw indicates the OFF state (OFF signal).

When the vehicle is not performing the braking operation and the determination of step S120 is negative (if "NO"), the process returns to step S110. When the vehicle is performing the braking operation and the determination of step S120 is affirmative (if "YES"), the process proceeds to step S130.

In step S130, the wheel acceleration (time change amount of wheel speed) dVw [] is calculated based on the wheel speed Vwa [] of each wheel WH []. Specifically, the wheel acceleration dVw [] (also simply referred to as "dVw") is calculated by time differentiating the wheel speed Vwa [**]. Here, the wheel acceleration dVw is calculated as a value having a positive (plus) sign when the rotational movement of the wheel WH is accelerating, and a negative (minus) sign when the rotational movement of the wheel WH is decelerating.

In step S140, the control state is determined based on at least one of the wheel speed Vwa and the wheel acceleration dVw. The "control state" includes "residual state" and "normal state" which is not the residual state. The residual state corresponds to a state in which "the influence of the acceleration slip Sks remains in the wheel speed Vwa [], but the wheel speed Vwa [] is converging toward the true value Vxs of the vehicle body speed". Furthermore, the normal state corresponds to a state in which the influence of the acceleration slip Sks does not exist in the wheel speed Vwa [**].

In step S140, when the normal state (state in which the residual state is denied) is determined as the control state, a control flag (determination flag) FLzn is set to "0" to display this. On the other hand, when the residual state is determined as the control state, the control flag FLzn is set to "1". The control state is set to the normal state (i.e., FLzn=0) as the initial state (default). A detailed method of determining the control state will be described later.

In step S150, the vehicle body speed Vxa is calculated based on the control state. More specifically, when the control state is the normal state (FLzn=0), the vehicle body speed Vxa is calculated based on the maximum speed value Vwa []d. Here, the "maximum speed value Vwa []d" is the largest value (i.e., fastest) among the wheel speeds Vwa [] of the four wheels WH []. The subscript "d" after the bracket indicates the "maximum value" among a plurality of corresponding wheel speeds (e.g., wheel speed Vwa [**]).

On the other hand, when the control state is the residual state (FLzn=1), the vehicle body speed Vxa is calculated based on a minimum speed value Vwa []s. Here, the "minimum speed value Vwa []s" is the smallest value (i.e., slowest) among the wheel speeds Vwa [] of the four wheels WH []. The subscript "s" after the bracket indicates the "minimum value" among a plurality of corresponding wheel speeds (e.g., wheel speed Vwa [**]).

Furthermore, when the vehicle body speed Vxa is calculated, a limitation is provided in the time change amount of the vehicle body speed Vxa. That is, the upper limit value αup of the increasing gradient and the lower limit value αdn of the decreasing gradient of the vehicle body speed Vxa are set, and the change in the vehicle body speed Vxa is restricted by the upper and lower limits αup, αdn. This is because the inertia of the entire vehicle is very large and is less likely to change as compared with the inertia of the wheel WH.

For example, when determination is made that the vehicle is in the normal state (i.e., not residual state) and the limitations of the upper and lower limit values αup, αdn of the change gradient are not received, the maximum speed value Vwa []d is calculated as it is as the vehicle body speed Vxa. On the other hand, when receiving the limitations of upper and lower limit values αup, αdn, the maximum speed value Vwa []d is limited by the upper and lower limit values αup, αdn, and the vehicle body speed Vxa is calculated.

Furthermore, when determination is made that the vehicle is in the residual state and the limitations of the upper and lower limit values αup and αdn of the change gradient are not received, the minimum speed value Vwa []s is determined as the vehicle body speed Vxa as is. On the other hand, when receiving the limitations of the upper and lower limit values αup, αdn, the minimum speed value Vwa []s is limited by the upper and lower limit values αup, αdn, and the vehicle body speed Vxa is calculated. After the vehicle body speed Vxa is determined in step S150, the process proceeds to step S160.

In step S160, the slip state quantity Slp [] of the wheel WH [] is calculated based on the comparison between the vehicle body speed Vxa and the wheel speed Vwa []. Here, the slip state quantity Slp [] (also simply referred to as "Slp") is a state quantity (variable) representing the slip degree of the wheel WH. For example, a slip speed which is a deviation of the vehicle body speed Vxa and the wheel speed Vwa is adopted as the slip state quantity Slp (Slp []=Vxa-Vwa []). Furthermore, the slip speed is made dimensionless by the vehicle body speed Vxa to calculate the slip rate (=Slp []/Vxa), and the slip rate can be adopted as the slip state quantity Slp [].

In step S170, the anti-skid control is executed based on the wheel acceleration dVw [] and the slip state quantity Slp []. Specifically, in each control mode of the anti-skid control, a plurality of threshold values are set in advance. Either one of the control modes, the reduction mode Mgn or the increase mode Mzo, is selected based on the correlation between these threshold values and "the wheel acceleration dVw [] and the slip state quantity Slp []". In addition, the duty ratio Dug of the pressure reducing valve and the duty ratio Duz of the pressure increasing valve are determined. Then, the electromagnetic valve SV is driven and the brake fluid pressure of the wheel cylinder WC is adjusted on the basis of the selected control mode and the determined duty ratio. In addition, in order to reflux the brake fluid from the low pressure reservoir RV, a drive signal of the electric motor MT is formed.

<Process of Determining Control State>

Figure 3:
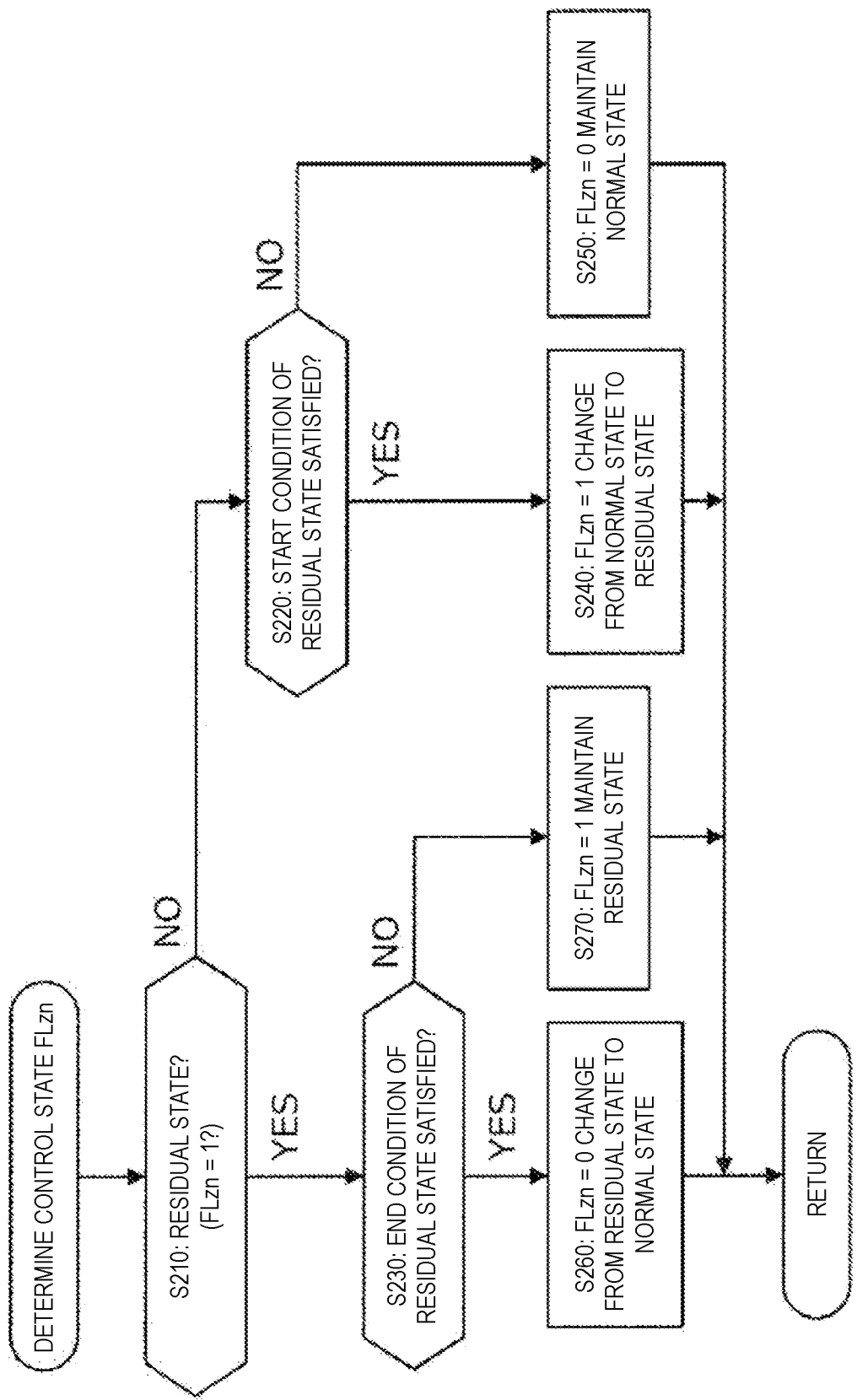
FIG. 3 is a flowchart explaining a process of determining a control state.

With reference to the flowchart of FIG. 3, the process of determining the control state in step S140 will be described. As described above, the control state includes two states (normal state and residual state). Each state is represented by a control flag (also referred to as a determination flag) FLzn. Specifically, "FLzn=0" is displayed in the normal state, and "FLzn=1" is displayed in the residual state.

In step S210, "whether or not the control state is the residual state" is determined based on the control state (i.e., control flag FLzn) in the previous calculation cycle. When "FLzn=0" and the result of step S210 is negative (if "NO"), the process proceeds to step S220. On the other hand, when "FLzn=1" and the result of step S210 is affirmative (if "YES"), the process proceeds to step S230. As the initial value, the control flag FLzn is set to "0".

In step S220, "whether or not the start condition of the residual state is satisfied" is determined based on the control mode of the wheel WH [], the wheel speed Vwa [], and the wheel acceleration dVw [**]. Specifically, when a state in which the following three conditions (1) to (3) are satisfied at the same time is continued for a predetermined duration tkx (corresponding to "predetermined time"), the start of the residual state is determined. Here, the predetermined duration tkx is a threshold value for time lapse determination, and is a predetermined value set in advance.

(1) In all four wheels WH [**], the reduction mode Mgn is selected. This condition is called "control mode condition".

(2) The wheel acceleration dVw [] is within a range of a predetermined wheel acceleration dvx. In other words, the absolute value of the wheel acceleration dVw [] is less than or equal to the predetermined wheel acceleration dvx. That is, "|dVw [**]|≦ dvx" is satisfied. Here, the predetermined wheel acceleration dvx is a threshold value for start determination, and is a predetermined value set in advance. The predetermined wheel acceleration dvx is a value larger than "0". This condition is called "wheel acceleration condition".

(3) The difference eVw between the maximum value (maximum speed value) Vwa []d of the four wheel speeds Vwa [] and the minimum value (minimum speed value) Vwa []s of the four wheel speeds Vwa [] is less than or equal to a predetermined speed vwy. That is, "Vwa []d−Vwa []s (=eVw)≦vwy" is satisfied. Here, the predetermined speed vwy is a threshold value for start determination, and is a predetermined value set in advance. As described above, the subscript "d" after the bracket indicates the "maximum value" of the corresponding plurality of signals, and the subscript "s" after the bracket indicates the "minimum value" of the corresponding plurality of signals. This condition is called "wheel speed condition".

When the start condition of the residual state is satisfied and the result of step S220 is affirmative (if "YES"), the process proceeds to step S240. Here, the calculation cycle in which the affirmative determination is made in step S220 is the starting time point of the residual state. On the other hand, when the start condition of the residual state is not satisfied and the result of step S220 is negative (if "NO"), the process proceeds to step S250.

In step S230, "whether or not the end condition of the residual state is satisfied" is determined based on the duration Tkz of the residual state. Specifically, when the duration Tkz is greater than or equal to the predetermined residual time tzn, the end of the residual state is determined. Therefore, when the duration Tkz is less than the predetermined residual time tzn, the end of the residual state is not determined and the residual state is continued. That is, the control state is switched from the residual state to the normal state at the time point (calculation cycle) the duration Tkz coincides with the predetermined residual time tzn. Here, the predetermined residual time tzn is a threshold for end determination and is a predetermined value set in advance.

When the end condition of the residual state is satisfied and the result of step S230 is affirmative (if "YES"), the process proceeds to step S260. Here, the calculation cycle in which the affirmative determination is made in step S230 is the terminating time point of the residual state. On the other hand, when the end condition of the residual state is not satisfied and the result of step S230 is negative (if "NO"), the process proceeds to step S270.

In step S240, the residual state is started. Specifically, the control state is switched from the normal state to the residual state. The control flag FLzn is switched from "0" to "1" at the starting time point (calculation cycle) of the residual state.

In step S250, the residual state is not started, and the control state is maintained in the normal state. That is, the control flag FLzn remains "0".

In step S260, the residual state is ended. Specifically, the control state is switched from the residual state to the normal state. At the terminating time point of the residual state (calculation cycle), the control flag FLzn is switched from "0" to "1".

In step S270, the residual state is not ended and the control state is maintained in the residual state. That is, the control flag FLzn remains "1".

In the processes from step S240 to step S270, the control state (i.e., control flag FLzn) is set, and the process proceeds to step S150. In step S150, when the control flag FLzn is "0" (when determined as not the residual state), the vehicle body speed Vxa is calculated based on the maximum speed value Vwa []d. On the other hand, when the control flag FLzn is "1" (when determined as the residual state), the vehicle body speed Vxa is calculated based on the minimum speed value Vwa []s.

<<Starting Process and Terminating Process of Residual State>>

The meaning of the starting process and the terminating process of the residual state will be described. On the assumption of the (1) control mode condition, it is determined that the braking torque and the road surface reactive force are approaching an equilibrium state (or are already in equilibrium state) by the (2) wheel acceleration condition. This is based on a phenomenon that "when the braking torque and the reactive force from the road surface are approaching an equilibrium state, the absolute value of the wheel acceleration dVw decreases". That is, since the braking torque is not increased in the reduction mode Mgn, if all the wheel accelerations dVw [] are within the range of the predetermined wheel acceleration dvx, the state is not a state in which all the wheel speeds Vwa [] are rapidly changing but is converging toward the true value Vxs of the vehicle body speed or has been converged to some extent.

Similarly, on the assumption of the (1) control mode condition, it is determined that the braking torque and the road surface reactive force are approaching an equilibrium state (or are already in equilibrium state) by the (3) wheel speed condition. Since the braking torque is not increased in the reduction mode Mgn, if all the wheel speeds Vwa [] are within the predetermined speed vwy, the state is not a state in which all the wheel speeds Vwa [] are rapidly changing but is converging toward the true value Vxs of the vehicle body speed or is converged to some extent.

Therefore, at a time point the state in which all the above three conditions are satisfied continued for the predetermined duration tkx, the control state is switched from the normal state to the residual state (i.e., residual state is started). When the wheel speed Vwa includes the acceleration slip Sks, the maximum speed value Vwa []d is deviated the most from the true value Vxs of the vehicle body speed, and the minimum speed value Vwa []s is the closest to the true value Vxs. Thus, the minimum speed value Vwa []s is adopted instead of the maximum speed value Vwa []d for the calculation of the vehicle body speed Vxa. As a result, the influence of the acceleration slip Sks is suppressed to a minimum.

Under the above-described start condition, a convergence state of a certain extent of the wheel speed Vwa [**] is determined based on the combination of "the control mode condition and the wheel acceleration condition" (referred to as "first group condition") and the combination of "the control mode condition and the wheel speed condition" (referred to as "second group condition"). A more reliable determination of the start of the residual state can be achieved by the two group conditions (first and second group conditions). However, one of the two group conditions can be omitted. That is, any one of the following three cases can be adopted as the start condition.

(A) When a state in which the two conditions of the control mode condition and the wheel acceleration condition are simultaneously satisfied is continued for the predetermined duration tkx (first group condition)

(B) When a state in which the two conditions of the control mode condition and wheel speed condition are simultaneously satisfied is continued for the predetermined duration tkx (second group condition)

(C) When a state in which the three conditions of the control mode condition, the wheel speed condition, and the wheel acceleration condition are simultaneously satisfied is continued for the predetermined duration tkx (first group condition+second group condition)

While the anti-skid control is being executed, the driver's acceleration operation has already been terminated. Therefore, the influence of the acceleration slip Sks at the wheel speed Vwa [**] is not continued for a long time. Therefore, when the duration Tkz of the residual state becomes greater than or equal to the predetermined residual time tzn, the residual state is ended and the state is returned to the normal state. The meaning of the starting process and the terminating process of the residual state has been described above.

<Operation/Effect>

Figure 4:
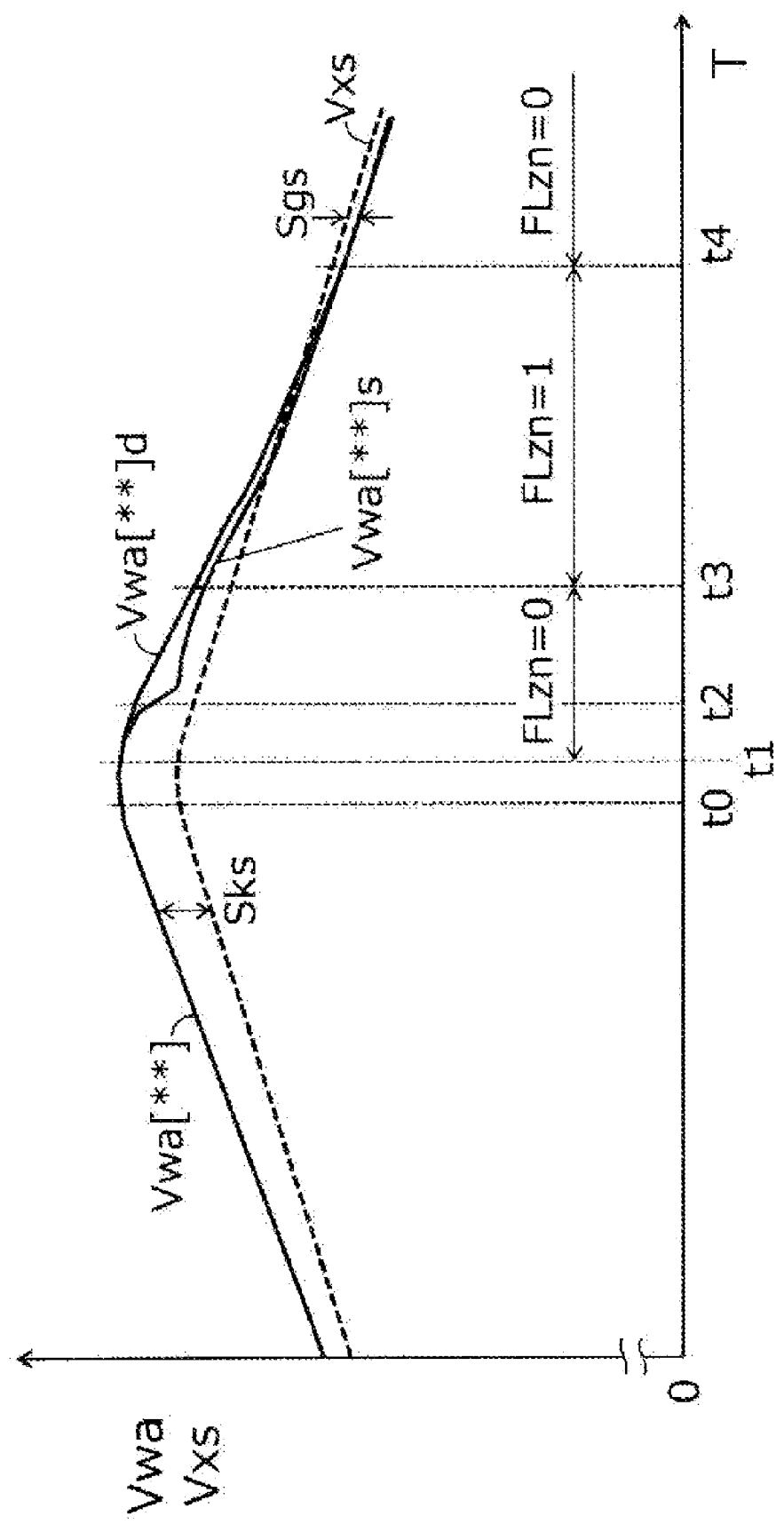
FIG. 4 is a time series diagram explaining problems, operations and effects caused by the acceleration slip Sks.

With reference to the time series diagram of FIG. 4, the operation and effect of the ASC for the vehicle according to the present invention will be described. A case where sudden braking is performed immediately after the vehicle is rapidly accelerated, and the antiskid control is executed is assumed. As described above, the subscript [] at the end of the reference symbol is the inclusive sign of each wheel. The subscript [] may be omitted.

The vehicle is rapidly accelerated until time point t0, and the acceleration slip Sks is generated in the four wheels WH []. At time point t0, the acceleration operation is terminated, and at time point t1 immediately thereafter, the braking operation is started, and at time point t2, the anti-skid control is started. Since each wheel WH [] is always (i.e., even at time of braking) mechanically connected to the power source PWU, the influence of acceleration still remains even if the braking operation is started.

From time point t2 to time point t3, the start condition of the residual state is not satisfied. Therefore, the control state remains in the normal state (FLzn=0) which is the initial state. Therefore, the vehicle body speed Vxa is calculated based on the maximum speed value Vwa [**]d.

At time point t3, the start condition of the residual state is satisfied. Specifically, a state in which "all of the four wheels WH [] are in the reduction mode Mgn (control mode condition)" and "the four wheel accelerations dVw [] are within a range of the predetermined wheel acceleration dvx (|dVw []|≤dvx) (wheel acceleration condition)" and the difference eVw between the maximum speed value Vwa []d and the minimum speed value Vwa []s is smaller than or equal to the predetermined speed vwy (Vwa []d−Vwa [**]s≦ vwy) (wheel speed condition) "is continued for the predetermined duration tkx. In other words, as the start condition, "a state in which the above three conditions (1) to (3) are satisfied at the same time is continued for the predetermined duration tkx" is adopted. The predetermined wheel acceleration dvx and the predetermined duration tkx (corresponds to "predetermined time") are threshold values for start determination, and are predetermined values set in advance.

Then, at time point t3, the control state is transitioned from the normal state (FLzn=0) to the residual state (FLzn=1). Thus, the vehicle body speed Vxa is calculated based on the minimum speed value Vwa []d (slowest of four wheel speeds Vwa []) instead of the maximum speed value Vwa[]d (fastest if four wheel speeds Vwa. In the situation where the acceleration slip Sks remains, the minimum speed value Vwa []s is the closest to the vehicle body speed true value Vxs. The slip state quantity Slp is appropriately calculated by calculating the vehicle body speed Vxa based on the minimum speed value Vwa [**]s. As a result, the control mode (in particular, the reduction mode Mgn) is appropriately selected and the vehicle can be reliably decelerated.

At time point t4, the end condition of the residual state is satisfied. Specifically, the duration Tkz of the residual state counted for time from the time point t3 reaches the predetermined residual time tzn. At time point t4, the control state is transitioned from the residual state (FLzn=1) to the normal state (FLzn=0). As a result, the vehicle body speed Vxa is calculated based on the maximum speed value Vwa []d instead of the minimum speed value Vwa []s.

Since the influence of the acceleration slip Sks is not continued for a long time, the wheel speed Vwa [] does not include the acceleration slip Sks before reaching time point t4, and the deceleration slip Sgn is generated. Therefore, it is returned to the method based on the maximum speed value Vwa []d which is the normal calculation method of the vehicle body speed Vxa.

As described above, in the start condition of the residual state, any one of the wheel acceleration condition and the wheel speed condition can be omitted. This is because both of these two conditions indicate that "all the wheel speeds Vwa [**] are converging towards the true value Vxs of the vehicle body speed or are converged to a certain extent", Other Embodiments Other embodiments will be described below. Even in the other embodiments, effects similar to above (reduction of influence of acceleration slip in calculation of vehicle body speed Vxa) are achieved.

In the embodiment described above, the configuration of the disc type braking device (disc brake) has been exemplified. In this case, the friction member MS is a brake pad and the rotating member KT is a brake disc. Instead of the disc type braking device, a drum type braking device (drum brake) can be adopted. In the case of a drum brake, a brake drum is adopted instead of the caliper CP. Furthermore, the friction member MS is a brake shoe and the rotating member KT is a brake drum.

In the embodiment described above, a hydraulic type using the brake fluid has been exemplified as a device for applying the braking torque to the wheel WH. Instead, an electrical type driven by an electric motor may be adopted. In the electrical device, the rotational power of the electric motor is converted into a linear power, whereby the friction member MS is pressed against the rotating member KT. Therefore, the braking torque is directly generated by the electric motor without depending on the pressure of the brake fluid. Furthermore, a composite type configuration in which a hydraulic type using a brake fluid is adopted for the front wheel, and an electrical type is adopted for the rear wheel can be formed.

The influence of the acceleration slip Sks appears immediately after the start of the anti-skid control. Therefore, the starting process of the residual state can be limited to within a predetermined time tst after the start of the anti-skid control. Specifically, the start determination of the residual state (process of step S220) is permitted until the predetermined time tst has elapsed from the starting time point of the anti-skid control. However, after the predetermined time tst has elapsed, the start determination process can be prohibited. The predetermined time tst is a threshold value for the limit determination and is a predetermined value set in advance.

Instead of the predetermined time tst described above, the number of reduction modes Mgn may be adopted. That is, in the reduction mode Mgn up to the nth time after the start of the antiskid control, the start determination of the residual state (process of step S220) is permitted. However, in the reduction mode Mgn after the (n+1)th time, the start determination processing is prohibited. Here, "n" is a predetermined number of times (predetermined positive integer), and for example, may be set as "n=1".

Furthermore, the acceleration state quantity of the vehicle is detected, and whether or not the start determination of the residual state is required can be determined based thereon. Specifically, when the acceleration state quantity is greater than or equal to the predetermined value, the process of determining the start of the residual state is executed, but when the acceleration state quantity is less than the predetermined value, the process of determining the start of the residual state can be prohibited. The acceleration state quantity can be calculated by at least one of the operation amount of the acceleration operation member (accelerator pedal), the throttle opening degree of the power source PWU (internal combustion engine), the injection amount, and the current flowing amount of the power source PWU (drive motor).

The invention claimed is:

1. An anti-skid control device for a vehicle applied to a four wheel drive vehicle in which a driving force from a driving source of the vehicle is transmitted to four wheels, the anti-skid control device comprising:
   a wheel speed sensor that detects wheel speeds of four wheels of the vehicle; and
   a controller that calculates a vehicle body speed of the vehicle based on at least one of the four wheel speeds and executes an anti-skid control for suppressing lock tendency of the four wheels by selectively switching between a reduction mode of reducing a braking torque applied to the four wheels and an increase mode of increasing the braking torque based on a comparison result between the four wheel speeds and the vehicle body speed; wherein
   the controller calculates accelerations of the four wheels based on the four wheel speeds, and is configured to include a control mode condition of selecting the reduction mode in all of the four wheels and a wheel acceleration condition in which the accelerations of all of the four wheels are within a range of a predetermined wheel acceleration;
   the controller determines as a residual state when a state in which the control mode condition and the wheel acceleration condition are satisfied at the same time is continued for a predetermined time, calculates the vehicle body speed based on a maximum speed value, which is a maximum value of the four wheel speeds, when determined as not the residual state, and calculates the vehicle body speed based on a minimum speed value, which is a minimum value of the four wheel speeds, when determined as the residual state.

2. The anti-skid control device for the vehicle according to claim 1, wherein the controller is configured to include a wheel speed condition in which a difference between the maximum speed value and the minimum speed value is less than or equal to a predetermined speed; and
   the controller determines as the residual state when a state in which the control mode condition, the wheel acceleration condition, and the wheel speed condition are satisfied at the same time is continued for the predetermined time.

3. An anti-skid control device for a vehicle applied to a four wheel drive vehicle in which a driving force from a driving source of the vehicle is transmitted to four wheels, the anti-skid control device comprising:
   a wheel speed sensor that detects wheel speeds of four wheels of the vehicle; and
   a controller that calculates a vehicle body speed of the vehicle based on at least one of the four wheel speeds and executes an anti-skid control for suppressing lock tendency of the four wheels by selectively switching between a reduction mode of reducing a braking torque applied to the four wheels and an increase mode of increasing the braking torque based on a comparison result between the four wheel speeds and the vehicle body speed; wherein the controller is configured to include a control mode condition of selecting the reduction mode in all of the four wheels and a wheel speed condition in which a difference between a maximum speed value, which is a maximum value of the four wheel speeds, and a minimum speed value, which is a minimum value of the four wheel speeds, is less than or equal to a predetermined speed; and the controller determines as a residual state when a state in which the control mode condition and the wheel speed condition are satisfied at the same time is continued for a predetermined time, calculates the vehicle body speed based on the maximum speed value when determined as not the residual state, and calculates the vehicle body speed based on the minimum speed value when determined as the residual state.

* * * * *